United States Patent [19]

Miyao et al.

[11] 3,869,939
[45] Mar. 11, 1975

[54] HYDROMECHANICAL TRANSMISSION
[75] Inventors: Takayuki Miyao; Hiroaki Maeda, both of Toyota, Japan
[73] Assignee: Aisin Seiki Co. Ltd., Kariya-shi, Aichi-ken, Japan
[22] Filed: Apr. 27, 1973
[21] Appl. No.: 354,956

[30] Foreign Application Priority Data
Apr. 28, 1972 Japan.............................. 47-42863

[52] U.S. Cl.................................. 74/687, 74/720.5
[51] Int. Cl........................ F16h 47/04, F16h 37/08
[58] Field of Search.................... 74/687, 730, 720.5

[56] References Cited
UNITED STATES PATENTS

| | | | |
|---|---|---|---|
| 3,364,790 | 1/1968 | Asper et al. | 74/687 |
| 3,373,635 | 3/1968 | Meurer | 74/687 X |
| 3,398,605 | 8/1968 | Ainsworth et al. | 74/687 X |
| 3,455,183 | 7/1969 | Orshansky, Jr. | 74/687 |
| 3,470,769 | 10/1969 | Livezey | 74/687 X |
| 3,492,891 | 2/1970 | Livezey | 74/687 X |
| 3,722,324 | 3/1973 | Cordner | 74/687 |

FOREIGN PATENTS OR APPLICATIONS
49,057  3/1965  Poland................................. 74/687

*Primary Examiner*—Samuel Scott
*Assistant Examiner*—P. S. Lall
*Attorney, Agent, or Firm*—Oblon, Fisher, Spivak, McClelland & Maier

[57] ABSTRACT

A hydromechanical transmission having an input rotary shaft, an output rotary shaft, two differential gear sets interposed between the input and output shafts, and hydrostatic pump-motors interconnected through means of a closed hydrostatic circuit and clutch means associated with the gear sets, whereby when the input shaft, the output shaft, and one of the pump-motors is connected to one of the gear sets while the other pump-motor is simultaneously connected to the output shaft an input split-type hydromechanical transmission is formed, while when the input shaft, output shaft, and one of the pump-motors is connected to the other one of the gear sets and the other pump-motor is simultaneously connected to the input shaft an output split-type hydromechanical transmission is formed, the latter transmission having a higher reference speed ratio than the former. Additional gearing may further be provided whereby the reference speed ratios may be varied to predetermined desired values.

3 Claims, 12 Drawing Figures

3,869,939

HYDROMECHANICAL TRANSMISSION

BACKGROUND OF THE INVENTION

1. Field of the Invention

The present invention relates generally to transmissions and more particularly to a hydromechanical transmission.

SUMMARY OF THE INVENTION

It is an object of the present invention to provide a hydromechanical transmission which maintains a high power-transmitting efficiency throughout a broad speed ratio range, and which exhibits little variation in hydrostatic pressure so as to prevent the occurrence of shocks due to switching from an output split-type to an input split-type hydromechanical transmission, or vice versa.

The foregoing and other objects are achieved according to this invention through the provision of a hydromechanical transmission which includes an input rotary shaft, an output rotary shaft, two hydrostatic pump-motors interconnected through means of a closed hydrostatic circuit, and two differential gear sets having three degrees of freedom provided through three gear elements, namely a sun gear, a ring gear and a set of planet gears, wherein the input rotary shaft, the output rotary shaft, and one of the hydrostatic pump-motors may be respectively connected to the three elements of one set of the differential gears, and simultaneously, the other hydrostatic pump-motor may also be connected to the output rotary shaft whereby an input split-type hydromechanical transmission is formed, or wherein the input rotary shaft, the output rotary shaft, and one of the hydrostatic pump-motors may be respectively connected to the three elements of the other set of differential gears, and simultaneously, the other hydrostatic pump-motor may be connected to the input rotary shaft whereby an output split-type hydromechanical transmission having a higher reference speed ratio than that of the input split-type hydromechanical transmission, is formed.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
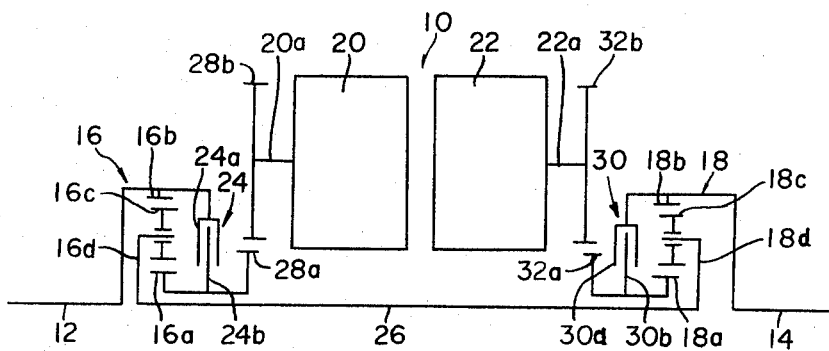
FIG. 1 is a schematic view of one embodiment of a hydromechanical transmission constructed according to this invention.

Referring now to the drawings, and more particularly to FIG. 1 thereof, a hydromechanical transmission, generally indicated by the reference character 10, includes an input rotary shaft 12, an output rotary shaft 14, two differential gear sets, generally indicated by the reference characters 16 and 18, interposed between shafts 12 and 14, and hydrostatic pump-motors 20 and 22 respectively associated with the gear sets. The differential gear set 16 includes a sun gear 16a, a ring gear 16b, and a planetary gear carrier 16d which rotatably carries a planet gear 16c which is rotatably interlocked between the sun gear and the ring gear. Similarly, the differential gear set 18 includes a sun gear 18a, a ring gear 18b, and a planetary gear carrier 18d which rotatably carries a planet gear 18c which is rotatably interlocked between the sun gear and the ring gear in a manner similar to planet gear 16c.

Within the differential gear set 16, the ring gear 16b is fixed to the input shaft 12 as well as to a first portion 24a of a clutch 24, the carrier 16d is fixed upon an intermediate rotary shaft 26, and the sun gear 16a is fixed to a second portion 24b of the clutch 24 as well as to another gear 28a. The gear 28a is interlocked to still another gear 28b which is fixed to a rotary shaft 20a of the hydrostatic pump-motor 20.

Similarly, within the differential gear set 18, the ring gear 18b is fixed to the output rotary shaft 14 as well as to a first portion 30a of a clutch 30, the carrier 18d is fixed to the intermediate rotary shaft 26, and the sun gear 18a is fixed to a second portion 30b of the clutch 30 as well as another gear 32a. The gear 32a is interlocked to still another gear 32b which is fixed to a rotary shaft 22a of the hydrostatic pump-motor 22. The hydrostatic pump-motors 20 and 22 are connected through a closed, hydrostatic circuit, not shown, and are respectively of the variable volumetric type.

The hydromechanical transmission 10 having such structure can of course be an input split-type hydromechanical transmission when the clutch 24 is disengaged while the clutch 30 is engaged, or it can be an output split-type hydromechanical transmission when the clutch 30 is disengaged while the clutch 24 is engaged. In either of the input split-type or the output split-type hydromechanical transmissions, when the ratio of the displacement of the hydrostatic pump-motor 22 to the displacement of the hydrostatic pump-motor 20, hereinafter referred to as the displacement ratio δ, is changed, then the ratio of the rotary speed of the output shaft 14 to the rotary speed of the input shaft 12, hereinafter referred to as the speed ratio $e$, is changed.

Figure 2:
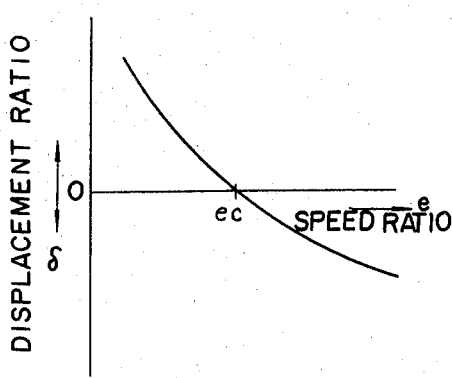
FIG. 2 is a displacement ratio-speed ratio characteristic graph for an input split-type hydromechanical transmission.
Figure 3:
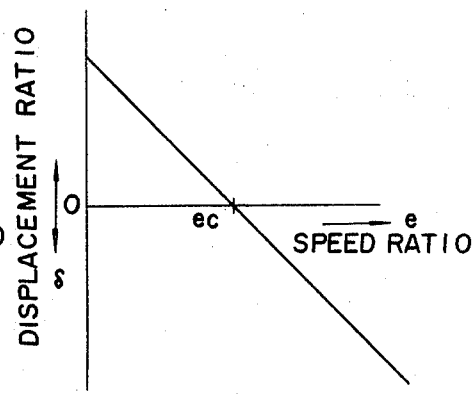
FIG. 3 is a displacement ratio-speed ratio characteristic graph for an output split-type hydromechanical transmission.
Figure 4:
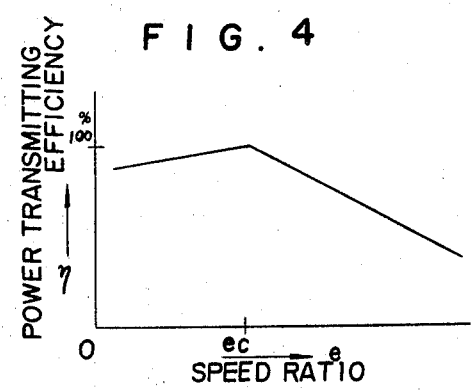
FIG. 4 is a power transmitting efficiency-speed ratio characteristic graph for the input split-type hydromechanical transmission.
Figure 5:
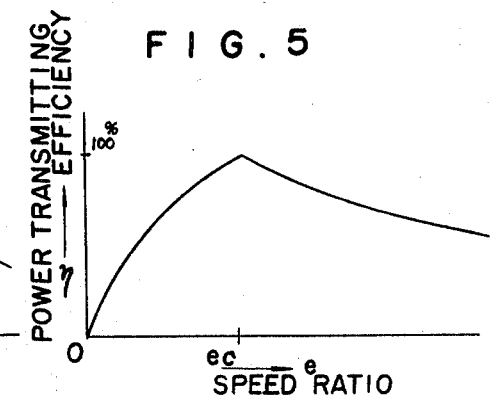
FIG. 5 is a power transmitting efficiency-speed ratio characteristic graph for the output split-type hydromechanical transmission.
Figure 6:
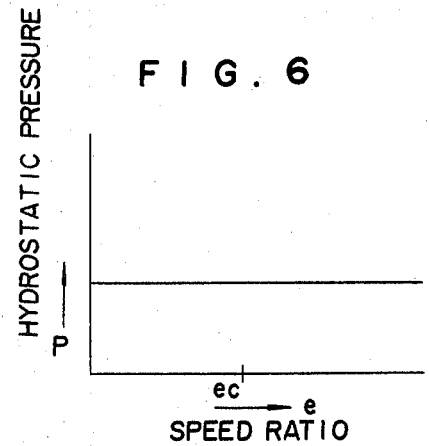
FIG. 6 is a hydrostatic pressure-speed ratio characteristic graph for the input split-type hydromechanical transmission.
Figure 7:
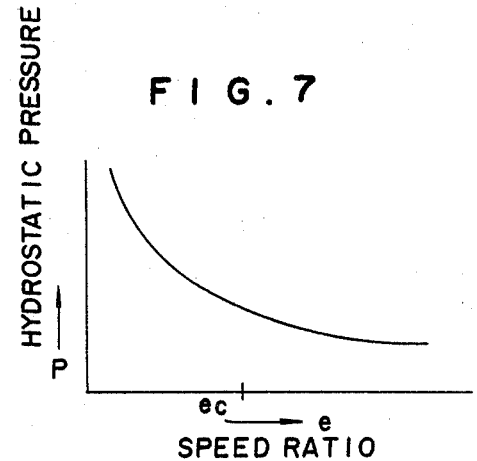
FIG. 7 is a hydrostatic pressure-speed ratio characteristic graph for the output split-type hydromechanical transmission.

Referring now to FIGS. 2 and 3, there is respectively shown displacement ratio δ - speed ratio $e$ characteristic graphs, wherein FIG. 2 is indicative of an input split-type hydromechanical transmission, and FIG. 3 is indicative of an output split-type hydromechanical transmission. Since oil leakage is presumed to be zero, when the displacement ratio δ is zero, the reference speed ratio $e_c$ is attained. FIGS. 4 and 5 similarly, respectively show speed ratio $e$ - power transmitting efficiency η characteristic graphs wherein FIG. 4 is indicative of the input split-type hydromechanical transmission, while FIG. 5 is indicative of the output split-type hydromechanical transmission. Since the mechanical power loss is presumed to be zero, the power transmitting efficiency η is 100 percent when the reference speed ratio $e_c$ is attained. Considering FIGS. 6 and 7, there is respectively shown speed ratio $e$-hydrostatic pressure P characteristic graphs, wherein FIG. 6 is indicative of the input split-type hydromechanical transmission while FIG. 7 is indicative of the output split-type hydromechanical transmission.

In the input split-type hydromechanical transmission, the reference speed ratio $e_{c1}$ is the speed ratio when the rotary speed of the hydrostatic pump-motor 20 is zero. Accordingly:

$$Z_2/(Z_1 + Z_2) < 1$$

wherein $Z_1$ represents the number of gear teeth upon the sun gear 16a, and $Z_2$ represents the number of gear teeth upon the ring gear 16b. In the output split-type hydromechanical transmission, the reference speed ratio $e_{c2}$ is the speed ratio when the rotary speed of the hydrostatic pump-motor 22 is zero. Accordingly:

$(Z_3 + Z_4)/Z_4 > 1$ wherein $Z_3$ represents the number of gear teeth upon the sun gear 18a, and $Z_4$ represents the number of gear teeth upon the ring gear 18b. It is noted that in the hydromechanical transmission of FIG. 1, the structure has been simplified as far as possible, whereby both parts of the clutch 24 as well as both parts of the clutch 30 can be respectively synchronized only when the speed ratio is 1.0. Accordingly, the reference speed ratios $e_{c1}$ and $e_{c2}$, the gear ratio $i_1$ of the gear 28b to the gear 28a, and the gear ratio $i_2$ of the gear 32b to the gear 32a are respectively selected under the conditions whereby the hydrostatic pressure associated with the speed ratio $e = 1.0$ within the split-type hydromechanical transmission is equal to the hydrostatic pressure associated with the speed ratio $e = 1.0$ within the output split-type hydromechanical transmission.

Figure 8:
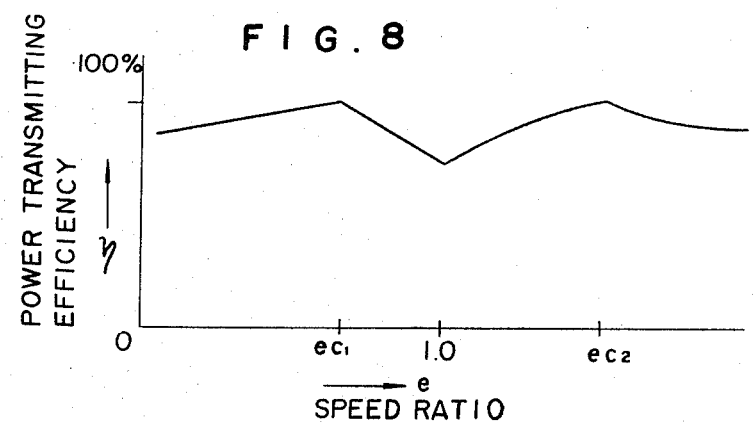
FIG. 8 is a power transmitting efficiency-speed ratio characteristic graph for the hydromechanical transmission of FIG. 1.
Figure 9:
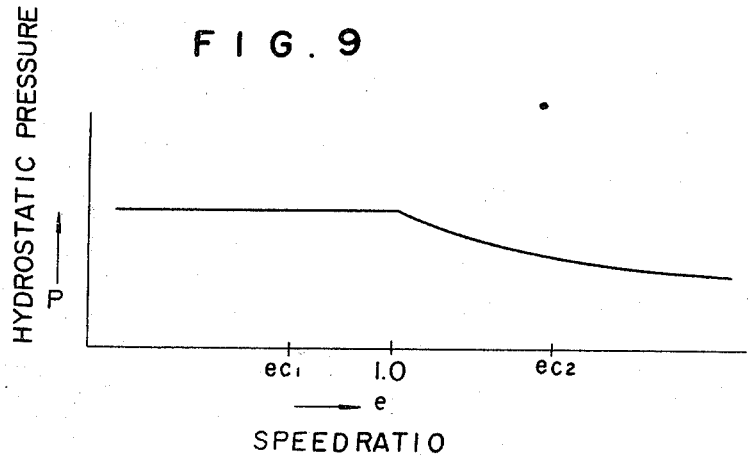
FIG. 9 is a hydrostatic pressure-speed ratio characteristic graph for the hydromechanical transmission of FIG. 1.

In the hydromechanical transmission, when the speed ratio $e$ is less than 1.0, the transmission is operated as an input split-type hydromechanical transmission, whereas when the speed ratio $e$ is increased to a value greater than 1.0, the transmission is switched from the input split-type hydromechanical transmission to the output split-type hydromechanical transmission at the speed ratio $e = 1.0$, whereby the variation in the power transmitting efficiency η relative to the variation in the speed ratio $e$ is shown in FIG. 8, wherein it is seen that a high power transmitting efficiency η can be maintained throughout a broad range of speed ratios. Moreover, variation in the hydrostatic pressure P relative to the variation in the speed ratio $e$, as shown in FIG. 9, is small. When in fact the speed ratio $e$ is 1.0, the hydrostatic pressure within the input split-type hydromechanical transmission is equal to the hydrostatic pressure within the output split-type hydromechanical transmission, and consequently the variations in the hydrostatic pressure and the power transmitting efficiency are continuous whereby substantially no shocks are caused by the switching from one type of transmission to the other.

It is of course additionally noted that in the present invention when the speed ratio $e$ is decreased, the transmission is operated as an input split-type hydromechanical transmission.

In general then, in the prior art, if during the switching mode of operation, the shock is to be minimized when the speed ratio is decreased within the output split-type hydromechanical transmission, the variation range of the hydrostatic pressure P is increased so that the pressure exceeds the limit of the pressure required for maintaining the efficiency of the hydrostatic pump-motor, whereby the power transmitting efficiency η is decreased. However, in accordance with the present invention, as described herein, such disadvantages can be overcome.

Figure 10:
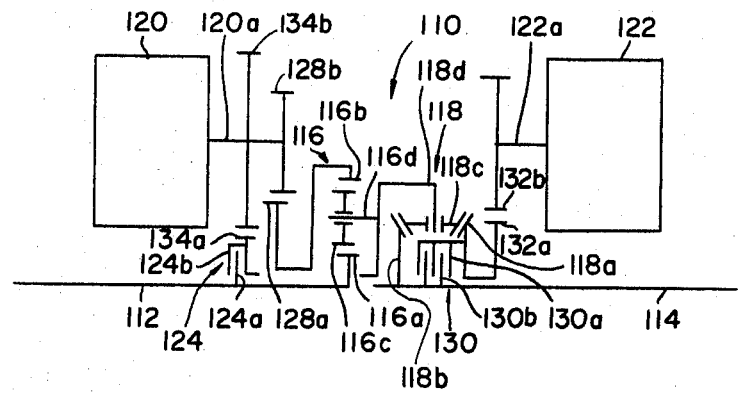
FIG. 10 is a schematic view of another embodiment of a hydromechanical transmission constructed according to this invention.

Now, with particular reference to FIG. 10, a second embodiment of the hydromechanical transmission of this invention is shown, being, generally indicated by the reference character 110, which includes an input rotary shaft 112, an output rotary shaft 114, differential gear sets generally indicated by the reference characters 116 and 118 interposed between shafts 112 and 114, and hydrostatic pump-motors 120 and 122 associated with the gear sets, respectively. Within the differential gear set 116, the sun gear 116a is fixed upon the input shaft 112, the ring gear 116b is interlocked with another gear 128a, and still another gear 128b interlocked with the gear 128a is fixed to a rotary shaft 120a of the hydrostatic pump-motor 120.

The planetary gear carrier 116d carrying the planetary gears 116c of the gear set 116 is fixed to a carrier 118d which carries the pinion gears 118c of the differential gear set 118, while a first side gear 118b is fixed to the output shaft 114 and a second side gear 118a is fixed to a gear 132a and a first portion 130a of a clutch 130. Another gear 132b interlocked with the gear 132a is fixed to a rotary shaft 122a of the hydrostatic pump-motor 122, and a second portion 130b of the clutch 130 is fixed to the output shaft 114. Similarly, a first portion 124a of the clutch 124 is fixed to the input shaft 112 and a second portion 124b of the clutch 124 is fixed to a gear 134a which is interlocked to another gear 134b fixed to the rotary shaft 120a of the hydrostatic pump motor 120, both of the hydrostatic pump-motors being interconnected through a closed hydrostatic circuit, not shown.

In the hydromechanical transmission 110, when the clutch 124 is disengaged and the clutch 130 is engaged, an input split-type hydromechanical transmission is formed, while when the clutch 130 is disengaged and the clutch 124 is engaged, an output split-type hydromechanical transmission is formed. The reference speed ratio $e_{c3}$ within the input split-type hydromechanical transmission may be expressed as follows:

$$e_{c3} = Z_5/(Z_5 + Z_6)$$

wherein $Z_5$ represents the number of teeth upon the sun gear 116a and $Z_6$ represents the number of teeth upon the ring gear 116b. Likewise, the reference speed ratio $e_{c4}$ within the output split-type hydromechanical transmission may be expressed as follows:

$$e_{c4} = [2 \cdot (Z_5 + i_3 \cdot i_4 \cdot Z_6)/(Z_5 + Z_6)]$$

wherein $i_3$ represents the gear teeth ratio of the gear 134b to the gear 134a and $i_4$ represents the gear teeth ratio of the gear 128b to the gear 128a.

The reference speed ratio $e_{c4}$ is set higher than the reference speed ratio $e_{c3}$ by appropriate selection of the parameters $Z_5$, $Z_6$, $i_3$ and $i_4$, and the hydrostatic pressure of the input split-type hydromechanical transmission is equal to the hydrostatic pressure of the output split-type hydromechanical transmission at the proper speed ratio for synchronizing both portions of the clutch 124 and both portions of the clutch 130 by appropriately selecting the parameters $Z_5$, $Z_6$, $i_3$ and $i_4$, whereby the transmission will be switched to the output split-type or to the input split-type hydromechanical transmission depending upon the desirable speed ratio $e$, so that the effects similar to those of the hydromechanical transmission of FIG. 1 can be obtained. It is of course noted that while in the hydromechanical transmission 10 of FIG. 1, the speed ratio for synchronizing both parts of the clutch 24 and both parts of the clutch 30 was limited to 1.0, in the hydromechanical transmission 110, the speed ratio $e$ can be varied by appropriately selecting the parameters $Z_5$, $Z_6$, $i_3$ and $i_4$.

Figure 11:
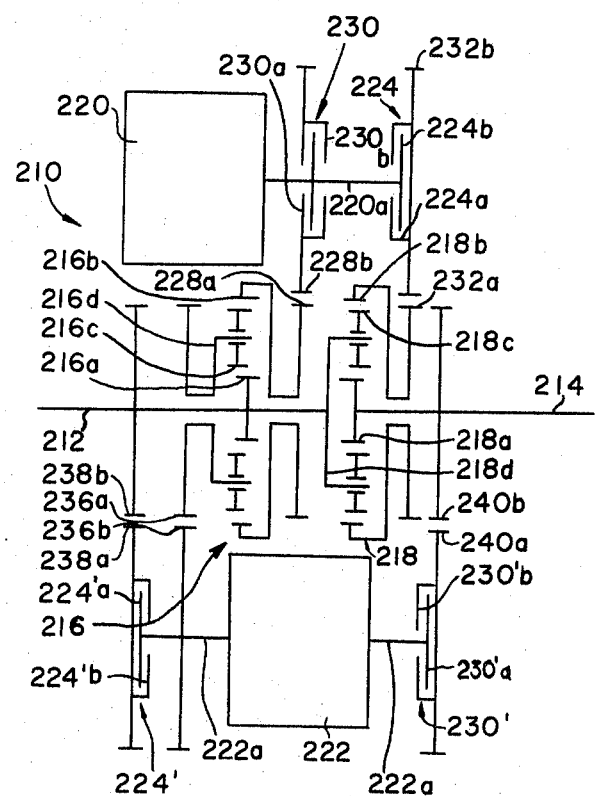
FIG. 11 is a schematic view of still another embodiment of a hydromechanical transmission constructed according to this invention.

Referring now to FIG. 11, another embodiment of the hydromechanical transmission of the present invention generally indicated by the reference character 210 similarly includes an input rotary shaft 212, and output rotary shaft 214, differential gears sets, generally indicated by the reference characters 216 and 218, respectively associated with and interposed between shafts 212 and 214, and hydrostatic pump-motors 220 and 222. Within the differential gear set 216, there is disposed a sun gear 216a which is fixed to the input shaft 212, a ring gear 216b which is interlocked with another gear 228a, and a planetary gear carrier 216d for carrying a planet gear 216c, which is fixed to still another gear 236a. Yet another gear 228b, interlocked with the gear 228a, is fixed to a first portion 230a of a clutch 230, while the second portion 230b of the clutch 230 is fixed to the rotary shaft 220a of the hydrostatic pump-motor 220, and another gear 236b, interlocked with the gear 236a, is similarly fixed to the rotary shaft 222a of the hydrostatic pump-motor 222.

Likewise, within the differential gear set 218, a sun gear 218a is fixed to the output shaft 214, a ring gear 218b is fixed to a gear 232a, and the planetary gear carrier 218d, which carries the planet gears 218c, is fixed to the input shaft 212. Another gear 232b, interlocked with the gear 232a, is fixed to one portion 224a of a clutch 224, while the other portion 224b of the clutch 224 is fixed to the rotary shaft 220a of the hydrostatic pump-motor 220. It is further noted that the rotary shaft 222a of the hydrostatic pump-motor 222 is interconnected with one portion 224'a of another clutch 224' at one end thereof, and is simultaneously connected with one portion 230'a of still another clutch 230' at the other end thereof. The other portion 224'b of the clutch 224' is then fixed to the gear 238a while the gear 238b, which is interlocked with the gear 238a, is fixed to the input shaft 212. Correspondingly, the other portion 230'b of the clutch 230' is fixed to a gear 240a while a gear 240b, which is interlocked with the gear 240a, is fixed upon the output shaft 214. The hydrostatic pump-motors 220 and 222 are of course interconnected with each other by means of a closed hydrostatic circuit, not shown.

Appreciation of the above-described hydromechanical transmission 210 will make it apparent that such transmission can of course be an input split-type hydromechanical transmission when the clutches 224 and 224' are disengaged while the clutches 230 and 230' are engaged, and on the other hand, such transmission can be of the output split-type when the clutches 230 and 230' are disengaged and the clutches 224 and 224' are engaged. Within the input split-type hydromechanical transmission, the reference speed ratio $e_{c5}$ may then be expressed as follows:

$e_{c5} = [Z_7/(Z_7+Z_8)] \cdot i_6 \cdot i_7$ wherein $Z_7$ represents the number of teeth upon the sun gear 216a, $Z_8$ represents the number of teeth upon the ring gear 216b, $i_6$ represents the gear teeth ratio of the gear 236b to the gear 236a, and $i_7$ represents the gear teeth ratio of the gear 240b to the gear 240a.

Within the output split-type hydromechanical transmission, the reference speed ratio $e_{c6}$ may be expressed as follows:

$$e_{c6} = (Z_9 + Z_{10})/z_9$$

wherein $Z_9$ represents the number of teeth upon the sun gear 218a, and $Z_{10}$ represents the number of teeth upon the ring gear 218b. The transmission may of course be switched to the output split-type hydromechanical transmission or to the input split-type hydromechanical transmission depending upon the speed ratio, by appropriately selecting the parameters $Z_7$, $Z_8$, $Z_9$, $Z_{10}$, $i_6$ and $i_7$, whereby effects similar to those of the hydromechanical transmission of FIG. 1 can be obtained. It is further noted that in the hydromechanical transmission 210, the synchronizing speed ratio of the clutches can also be selected as desired.

Figure 12:
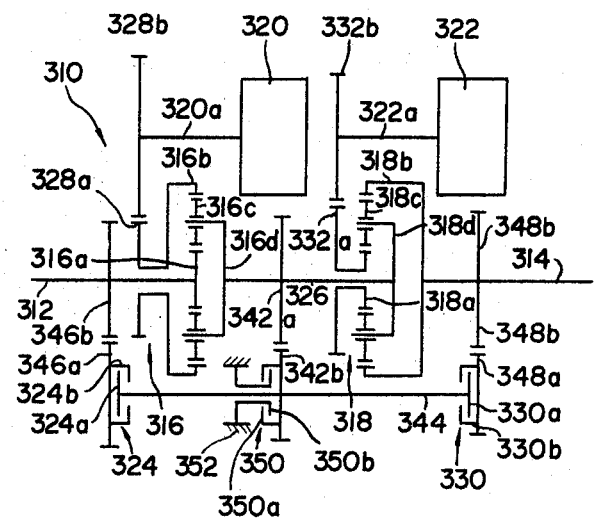
FIG. 12 is a schematic view of yet another embodiment of a hydromechanical transmission constructed according to this invention.

Referring now to the embodiment of the hydromechanical transmission of the present invention generally indicated by the reference character 310, as seen in FIG. 12, there is provided an input rotary shaft 312, an output rotary shaft 314, respective differential gear sets generally indicated by the reference characters 316 and 318, interposed therebetween, and hydrostatic pump-motors 320 and 322. Within the differential gear set 316, the sun gear 316a is fixed upon the input shaft 312, and the ring gear 316b is interlocked with the gear 328a, while the planetary gear carrier 316d carrying the planet gears 316c is fixed to an intermediate rotary shaft 326 interposed between shafts 312 and 314. Another gear 328b which is interlocked to the gear 328a is fixed upon the rotary shaft 320a of the hydrostatic pump-motor 320.

Within the differential gear set 318, the sun gear 318a is similarly interlocked with a gear 332a, the ring gear 318b is fixed upon the output shaft 314, and the planetary gear carrier 318d carrying the planet gears 318c is fixed upon the intermediate rotary shaft 326. A gear 332b is interlocked with the gear 332a and is fixed upon the rotary shaft 322a of the hydrostatic pump-motor 322, while another gear 342a fixed upon the intermediate rotary shaft 326 is interlocked with still another gear 342b fixed upon still another intermediate rotary shaft 344. Opposite ends of the intermediate rotary shaft 344 are in turn fixed to one part 324a of a clutch 324 and one part 330a of a clutch 330. The other part 324b of the clutch 324 is fixed to yet another gear 346a, and still another gear 346b, which is interlocked with the gear 346a, is fixed upon the input shaft 312. In turn, the other part 330b of the clutch 330 is fixed to still another gear 348a and a gear 348b, which is interlocked with the gear 348a, is fixed upon the output shaft 314. One portion 350a of still another clutch 350 is fixed to gear 342b while the other part 350b of the clutch is fixed to stationary means 352. Both of the hydrostatic pump-motors are of course interconnected through means of a closed hydrostatic circuit, not shown, and are of the variable volume type.

Within the hydromechanical transmission 310 then, it is apparent that such transmission can be of the input split-type when the clutches 324 and 350 are disengaged and the clutch 330 is engaged, and correspondingly, such transmission can be of the output split-type when the clutches 330 and 350 are disengaged and the clutch 324 is engaged. Within the input split-type hydromechanical transmission, the reference speed ratio $e_{c7}$ can of course be expressed as follows:

$$e_{c7} = [Z_{11}/(Z_{11} + Z_{12}] \cdot i_8 \cdot i_9$$

wherein $Z_{11}$ represents the number of teeth upon the sun gear 316a, $Z_{12}$ represents the number of teeth upon the ring gear 316b, $i_8$ represents the gear teeth ratio of the gear 342b to the gear 342a, and $i_9$ represents the gear teeth ratio of the gear 348b to the gear 348a.

Within the output split-type hydromechanical transmission, the reference speed ratio $e_{c8}$ can likewise be expressed as follows:

$$e_{c8} = [(Z_{13} + Z_{14})/Z_{14}] \cdot i_8 \cdot i_{10}$$

wherein $Z_{13}$ represents the number of teeth upon the sun gear 318a, $Z_{14}$ represents the number of teeth upon the ring gear 318b, and $i_{10}$ represents the gear teeth ratio of the gear 346a to the gear 346b.

The transmission can thus be switched to an output split-type hydromechanical transmission or an input split-type hydromechanical transmission depending upon the speed ratio, whereby effects similar to those of the hydromechanical transmission 10 of FIG. 1 can be obtained. In the hydromechanical transmission 310, the speed ratio for synchronizing both parts of the clutch 324 and both parts of the clutch 330 may be altered by appropriately selecting the parameters $Z_{11}$, $Z_{12}$, $Z_{13}$, $Z_{14}$, $i_8$, $i_9$ and $i_{10}$, whereupon a desirable value can be achieved. Moreover, the hydromechanical transmission 310 can be a pure hydrostatic transmission when the clutches 324 and 330 are disengaged and the clutch 350 engaged.

In accordance with this invention then, it is possible to maintain a high power-transmitting efficiency throughout a broad speed ratio range, and wherein shocks normally encountered upon switching transmissions can be prevented by decreasing the range through which the hydrostatic pressure may vary.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A hydromechanical transmission comprising:
an input rotary shaft;
an output rotary shaft;
a pair of variable volume hydrostatic pump-motors being interconnected with each other through means of a closed hydrostatic circuit;
a first differential gear set having a first gear element connected with said input rotary shaft, a second gear element, and a third gear element connected with said first and second gear elements thereof;
a second differential gear set having a first gear element connected with said output rotary shaft, a second gear element, and a third gear element connected with said first and second gear elements thereof and to said third gear element of said first differential gear set;
a first gear connected with said second gear element of said first differential gear set for rotation therewith;
a second gear mounted on the rotary shaft of one of said hydrostatic pump motors and connected with said first gear for rotation therewith;
a third gear mounted on said rotary shaft of said one of said hydrostatic pump motors;
a fourth gear rotatable with said third gear;
first clutch means between said fourth gear and said input rotary shaft for coupling said first gear element and said second gear element of said first differential gear set for simultaneous rotation;
a fifth gear mounted on the rotary shaft of the other of said hydrostatic pump motors;
a sixth gear connected between said fifth gear and said second gear element of said second differential gear set for rotation therewith; and
second clutch means between said second gear element of said second differential gear set and said output rotary shaft for coupling said first gear element and said second gear element of said second differential gear set for simultaneous rotation.

2. A hydromechanical transmission comprising:
an input rotary shaft;
an output rotary shaft;
a pair of variable volume hydrostatic pump-motors being interconnected with each other through means of a closed hydrostatic circuit;
a first differential gear set having a first gear element connected with said input rotary shaft, a second gear element connected with one of said hydrostatic pump-motors, and a third gear element connected with said first and second gear elements thereof;
a second differential gear set having a first gear element connected with said output rotary shaft, a second gear element connected with the other of said hydrostatic pump-motors, and a third gear element connected with said first and second gear elements thereof;
an intermediate rotary shaft supporting said third gear element of said first differential gear set on one end and said third gear element of said second differential gear set on the other end thereof;
a first gear on said intermediate rotary shaft;

a second gear connected with said first gear for rotation therewith;

first clutch means between said second gear and said input rotary shaft for coupling said first gear element and said third gear element of said first differential gear set; and second clutch means between said second gear and said output rotary shaft for coupling said first gear element and said third gear element of said second differential gear set.

3. A hydromechanical transmission comprising:

an input rotary shaft;

an output rotary shaft;

a pair of variable volume hydrostatic pump-motors being interconnected with each other through means of a closed hydraulic circuit;

a first differential gear set having a first gear element connected with said input rotary shaft, a second gear element connected with one of said hydrostatic pump-motors, and a third gear element connected with said first and second gear elements thereof;

a second differential gear set having a first gear element connected with said output rotary shaft, a second gear element connected with said one of said hydrostatic pump-motors, and a third gear element connected with said first and second gear elements thereof and to said input rotary shaft;

a first gear on said input rotary shaft;

first clutch means for coupling said first gear to the other of said hydrostatic pump-motors;

a second gear on said output rotary shaft;

second clutch means for coupling said second gear to said other of said hydrostatic pump-motors;

third clutch means between said second gear element of said first differential gear set and said one of said hydrostatic pump-motors; and fourth clutch means between said second gear element of said second differential gear and said one of said hydrostatic pump-motors.

* * * * *